Patented Mar. 25, 1930

1,751,988

UNITED STATES PATENT OFFICE

HARRY F. GARDNER, OF BUFFALO, NEW YORK, ASSIGNOR, BY MESNE ASSIGNMENTS, TO CERTAIN-TEED PRODUCTS CORPORATION

ADHESIVE

No Drawing.   Application filed March 31, 1922.   Serial No. 548,540.

This invention relates to adhesives and particularly to adhesives employed in cementing together plies of fibrous material.

Among other objects, the invention is intended to provide a relatively inexpensive and improved adhesive capable of use particularly in the manufacture of fibrous board.

The invention consists in the novel compositions, combinations and methods, hereinafter described or claimed, for carrying out the above stated object and such other objects as will hereinafter appear.

The character of the invention may be best understood by reference to certain illustrative embodiments thereof, hereinafter described.

Commercial sodium silicate, known as water-glass, is largely employed as an adhesive in the manufacture of laminated fibre board such as wall board. The sodium silicate which I employ in carrying out my invention may be the "N" brand manufactured by the Philadelphia Quartz Company, which comprises 8.9% $Na_2O$, 29.0% $SiO_2$ and 62.1% $H_2O$ and has a specific gravity of substantially 41° Baumé.

In order to provide a less expensive adhesive and one with certain improved properties, I add to the sodium silicate a fibrous mineral such as fibrous talc (agalite) or asbestos and also, preferably, add to the same brine in such quantities as not to impair seriously the adhesive properties of the resultant mixture for use in the manufacture of fibrous boards.

For example, to 560 gallons of silicate at approximately 41 degrees Baumé, 1,000 pounds of fibrous talc is added and mixed. To this is added approximately 140 gallons of brine at about 20 degrees Baumé. Brine of this density may be made by dissolving about 290 pounds of salt (sodium chloride or its equivalent) in 127 gallons of water. The brine-talc-silicate is then thoroughly mixed.

The talc employed is preferably off-color, fibrous talc which is less expensive than other mineral matter heretofore employed in the manufacture of adhesive. It is preferable to asbestos where color of the adhesive is important, inasmuch as cheap asbestos is of a grey green color. In making wall board, it is desirable to make the streaks of adhesive between the plies of board as inconspicuous as possible. It is therefore desirable to use the light colored agalite, known also commercially as asbestine. Moreover, the fibrous talc is not more expensive and sometimes cheaper than other minerals such as powdered clay heretofore mixed with the silicate and it is free from sand and grit usually found in such clay. The absence of the sandy matter reduces the wear on the equipment. Moreover, the talc remains in suspension much longer without any serious settling than clay of equal fineness.

I have observed that relatively less talc is required to obtain a given viscosity than when clay is employed.

The fibres of the talc or other fibrous mineral apparently swell and act to increase the viscosity of the mixture, and accordingly larger quantities of brine or water may be added to the mixture without reducing the viscosity below the allowable limit which is that of the "N" brand heretofore described or impairing the adhesive properties for use in manufacturing fibrous boards. In the manufacture of fibrous boards the adhesive employed should possess binding qualities at least equal to those existing between the paper fibers of the layers forming the board so that the layers will not separate when the board is subjected to strains.

The percentage of talc and brine added and the concentration of the brine may be varied within certain limits without impairing the adhesive qualities of the mixture. These percentages may be altered also to vary the viscosity of the mixture if desired.

For example, a suitable adhesive for use in making wall board may be obtained by mixing with 560 gallons of silicate, at approximately 40.9 degrees Baumé, about 1800 pounds of talc. To this is added about 140 gallons of brine at approximately 17.8 degrees Baumé. The resultant compound is then thoroughly mixed, if necessary. At prevailing prices of the ingredients employed, this adhesive is somewhat cheaper than the first given.

Although an adhesive suitable for making wall board may be made by adding merely brine of the proper amount and concentration to sodium silicate, this adhesive requires careful measurement of the ingredients. However, when brine is added to the talc-silicate adhesive, the mixing need not be done with such accuracy for, apparently, the fibrous talc compensates for small errors in the measurement and concentration of the brine.

Apparently, when talc is employed instead of clay, a certain amount of water may be added to or a silicate of greater water dilution may be employed in making the improved adhesive, without seriously impairing the adhesive strength, for my purpose,—a practice impossible in a clay-silicate adhesive.

The use of fibrous talc in the adhesive improves the fire and moisture resisting properties of wall board, or the like, the plies of which are cemented together by the improved adhesive. Moreover, the use of talc makes a smooth adhesive which covers a relatively larger surface and sets, relatively, more slowly. Also the talc-brine-silicate adhesive adheres better to the plies of paper or the like than a plain brine-silicate adhesive. I have observed also that less moisture or water is absorbed by the paper when the improved adhesive is employed, thus reducing drying costs.

The characteristic of slow setting of the adhesive is advantageous in the manufacture of wall board, inasmuch as it permits a certain amount of manipulation of the product before setting of the adhesive occurs. For instance when the product is cut into lengths, a slight buckling of certain of the plies of board frequently occurs. As long as the adhesive remains sticky and viscous, this disturbance of the plies or laminations does not impair the ultimate bond between the plies.

When plain brine-silicate adhesive is employed in the manufacture of wall board or the like, there is a tendency of the adhesive to absorb water and soften the board, due to the presence in the brine of the impurity, calcium chloride. Moreover, I have observed that there is a tendency of this adhesive to soften and "salt out". These objectionable characteristics or tendencies of plain brine-silicate adhesive are apparenty eliminated by the use of talc in such adhesive.

Having thus described my invention, I claim:

An adhesive for the purpose described, consisting of a mixture of sodium silicate of approximately 41° Baumé, 1.8 pounds of fibrous talc per gallon of silicate, and brine of approximately 20 Baumé, the quantity of brine being approximately 25% by volume of the silicate.

In testimony whereof, I have signed my name to this specification.

HARRY F. GARDNER.